United States Patent
Milner (10) Patent No.: US 10,612,696 B2
(45) Date of Patent: Apr. 7, 2020

(54) MODULAR TUBING CLAMP SYSTEM

(71) Applicant: Travis Milner, Hockley, TX (US)

(72) Inventor: Travis Milner, Hockley, TX (US)

(*) Notice: Subject to any disclaimer, the term of this patent is extended or adjusted under 35 U.S.C. 154(b) by 0 days.

(21) Appl. No.: 16/166,632

(22) Filed: Oct. 22, 2018

(65) Prior Publication Data

US 2019/0120408 A1 Apr. 25, 2019

Related U.S. Application Data

(60) Provisional application No. 62/574,889, filed on Oct. 20, 2017.

(51) Int. Cl.
| | |
|---|---|
| *F16L 3/22* | (2006.01) |
| *F16B 2/12* | (2006.01) |
| *F16B 1/00* | (2006.01) |
| *F16L 3/10* | (2006.01) |
| *F16B 2/06* | (2006.01) |
| *F16L 3/223* | (2006.01) |

(52) U.S. Cl.
CPC ............ *F16L 3/221* (2013.01); *F16B 1/0071* (2013.01); *F16B 2/065* (2013.01); *F16B 2/12* (2013.01); *F16L 3/1091* (2013.01); *F16L 3/2235* (2013.01)

(58) Field of Classification Search
CPC ....... F16L 3/221; F16L 3/1091; F16B 1/0071; F16B 2/065; F16B 2/12
See application file for complete search history.

(56) References Cited

U.S. PATENT DOCUMENTS

| | | | | |
|---|---|---|---|---|
| 2,417,260 | A * | 3/1947 | Morehouse | F16L 3/227 174/135 |
| 3,186,051 | A * | 6/1965 | Waddell | F16L 3/222 403/391 |
| RE26,011 | E * | 5/1966 | Girard | F16L 3/222 248/68.1 |
| 3,856,246 | A * | 12/1974 | Sinko | F16L 3/222 248/68.1 |
| 3,964,707 | A * | 6/1976 | Lewis | F16L 1/028 248/49 |
| 4,099,626 | A * | 7/1978 | Magnussen, Jr. | A47B 63/02 211/194 |
| 4,199,070 | A * | 4/1980 | Magnussen, Jr. | A47B 63/02 138/112 |
| 4,775,121 | A * | 10/1988 | Carty | F16L 3/2235 248/68.1 |

(Continued)

*Primary Examiner* — Anita M King
(74) *Attorney, Agent, or Firm* — Egbert Law Offices, PLLC (57) ABSTRACT

A modular tubing clamp system includes an upper plate, lower plate and a plurality of interlocking blocks forming an upper set of blocks and an inverted lower set of blocks. Each of the plurality of interlocking blocks includes a recess formed therein such that the recess of one interlocking block and the corresponding recess of an inverted interlocking block serve to hold a piece of tubing therebetween. The recesses are preferably sized so as to fit various types of pipe such that a tubing clamp can be assembled depending on the needs of the job. Each of the interlocking blocks has a protrusion on one end thereof and a slot on an opposite end thereof, the protrusion being sized to fit within the slot of an adjacent block. The upper and lower place a plurality of interlocking blocks are secured together using preferably a bolt.

13 Claims, 4 Drawing Sheets

(56) References Cited

U.S. PATENT DOCUMENTS

| | | |
|---|---|---|
| 6,308,921 B1 | 10/2001 | Borzucki |
| 6,783,101 B2 | 8/2004 | Knotts |
| 8,074,945 B2 * | 12/2011 | Schoenau ................ F16L 5/14 248/316.6 |
| 9,435,466 B2 | 9/2016 | Robert, Jr. |
| 2005/0006534 A1 * | 1/2005 | Shillings ................ F16L 3/223 248/68.1 |
| 2010/0258687 A1 * | 10/2010 | Celikkol ................ F16L 3/222 248/74.4 |
| 2015/0192225 A1 | 7/2015 | Vo |

* cited by examiner

MODULAR TUBING CLAMP SYSTEM

RELATED U.S. APPLICATIONS

The present application claims priority from U.S. Provisional Application No. 62/574,889, filed on Oct. 20, 2017, and entitled "Modular Tubing Clamp System".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of pipe or tubing clamps. More particularly, the present invention relates to tubing clamps for holding different sizes of tubing. Even more particularly, the present invention relates to a tubing clamp system comprising a plurality of modular tubing clamp blocks for supporting tubing having various diameters.

2. Description of Related Art Including Information Disclosed Under 37 CFR 1.97 and 37 CFR 1.98

Tubing clamps are used in a variety of environments, including commercial and industrial buildings and offshore applications. Tubing clamps are utilized to position tubes and support them as they are run throughout the structure. Code requirements may necessitate that the tubing is supported by tubing clamps or other structures at intervals of approximately 18 inches.

In many cases, tubing having different sizes may be run side-by-side throughout a structure. Purposes of tubing clamps, in addition to simple support of the tubing, can include prevention of electrolysis and corrosion, in particular in cases where environmental conditions are severe. Additionally, tubing clamps ideally reduce vibration of the tubing.

Various patents have issued in the past related to tubing or pipe clamps. For example, U.S. Pat. No. 6,308,921, issued on Oct. 30, 2001 to Borzucki discloses a two-pipe clamp. The two-pipe clamp has two clamping bodies forming a pair of clamping cheeks, and between them form two passages, each intended for a tubular body. The clamping bodies can be pressed against one another by a tightening screw extending between the passages from a top cover plate to a base plate. The pair of clamping cheeks are held between the two plates. Each clamping body is framed by an exterior security strip forming a reinforcement. Each strip has a central segment extending between the cover plate or the base plate and the relevant clamping bodies. Bent end legs or the security strips extend along the relevant open side surfaces of the clamping bodies. The lengths of these legs are determined, so that upon the pressing of the clamping bodies, engagement of the leg ends limits their clamping force.

U.S. Pat. No. 6,783,101, issued on Aug. 31, 2004 to Knotts, describes a clamp for securing multiple spaced-apart tubes. Particularly, this invention is related to boiler tube clamps. The boiler tube clamp, for securing boiler tubes in an equal-spaced, parallel arrangement, includes a pair of mating half-clamps having multiple opposed recesses sized to snugly cradle boiler tubes of a given diameter. The half-clamps are brought together around the boiler tubes and either welded or bolted together, thereby aligning the tubes in the desired arrangement. The bolts and/or clamps used to secure together the mating half-clamps of each of the embodiments of the invention are unaffected by downward abrasive action that typically occurs in boilers. For welded-together half-clamps, the welds are on top and bottom surfaces where they are shielded from abrasive action. For bolted-together half-clamps, the bolts are protected from abrasive action by recessing the bolt heads and retaining nuts.

U.S. Patent Publication No. 2015/0192225, published on Jul. 9, 2015 in the name of Vo, describes an interlocking line block assembly. Specifically, this publication describes an aircraft industry-related interlocking line block assembly that has a first block portion and a second block portion, each with an outer end surface, an inner end surface defining a plurality of concave receptacles, a plurality of side surfaces extending between the inner end surface and the outer end surface, at least one of the side surfaces having a retention member, and an aperture extending between the inner end surface and the outer end surface. A spacer projects from the a block support of the second block portion and through the aperture of the second block portion, the spacer configured to be slidably received within the aperture of the first block portion when the first block portion is mated with the second block portion.

As noted above, one of the challenges of tubing clamp manufacturers is to accommodate multiple sizes of tubing being supported by the same clamp. U.S. Pat. No. 9,435,466 (the '466 patent), issued on Sep. 6, 2016 to A. K. Robert, Jr. discloses such a clamp. The clamp of the '466 patent may be composed of the acetol Delrin plastic material and which has frusto conical sections formed thereon so as to contact the tubing secured by the clamp. The frusto conical sections allow for minimum contact between the clamp and the tubing, thus reducing the amount of corrosion associated with the clamping of the tubing. The tubing clamp of the '466 patent is composed of cylindrically-shaped clamp bodies. Grooves are formed in the clamp body along a longitudinal axis thereof.

One disadvantage of the clamp described in the '466 patent as well as other pipe clamps is the inability to accommodate on-site changes in the size or number of tubing elements. Specifically, in the prior art, the size and number of tubing elements to be installed must be predetermined so that the pipe clamp or clamps can be ordered in such a configuration. The tubing clamp of the '466 patent and other similar tubing clamps are not adaptable to a change in the size or number of tubing to be supported. For example, should a change in plans necessitate change from a ¼" tubing element to a 1" tubing element, an entirely new clamp would have to be acquired. This would result in increased costs in labor and in the delay associated with acquiring the new clamp. As such, a need has arisen to provide a tubing clamp which can accommodate various sizes and numbers of tubing with on-site assembly or modification.

It is another object of the present invention to provide a tubing clamp assembly which prevents corrosion and electrolysis on the tubing.

It is another object of the present invention to provide a tubing clamp apparatus which is modular.

It is another object of the present invention to provide a tubing clamp apparatus or system which reduces vibration in the tubing.

It is yet another object of the present invention to provide a modular tubing clamp system which is easy to assemble and install, thus reducing installation labor and costs.

These and other objects and advantages of the present invention will become apparent from a reading of the attached specification and appended claims.

BRIEF SUMMARY OF THE INVENTION

An embodiment of the present invention is a modular tubing clamp having an upper plate, lower plate and a plurality of intersecting blocks forming an upper set of blocks in an inverted lower set of blocks. The upper set of blocks and the inverted lower set of blocks are adapted to secure tubing therebetween. Each of the plurality of interlocking blocks includes a body, a protrusion on one end of the body, a slot on opposite end of the body, the slot received by a protrusion of an adjacent interlocking block, and a recess formed on the body. The recess is adapted to receive a tube.

In an embodiment, the recess has a pair of opposing angled edges adapted to abut the tube.

In another embodiment, each of the pair of opposing angled edges has a radius corresponding to a radius of the tube.

In an embodiment, each of the plurality of intersecting blocks further includes a seat formed in the body adjacent the protrusion. A slot of an adjacent interlocking block abuts the seat when the slot of the adjacent interlocking block receives the protrusion.

In an embodiment, each of the slots of the plurality of interlocking blocks includes a pair of arms extending outwardly of the body. Each of the pair of arms as an inwardly extending portion to secure a protrusion of an adjacent block therein. An open bottom end is also provided on the slot so as to receive the protrusion of the adjacent interlocking block.

In an embodiment, the system also include a plurality end piece blocks. Each of these include a body, a protrusion on one end of the body, slot on opposite end of the body, the slot being received by a protrusion of an adjacent interlocking block, and a passageway formed through the body. The upper set of blocks and lower set of blocks may include a first end piece block, a second end piece block, and a plurality of interlocking blocks connected to positioned and between the first end piece block and the second end piece block. The upper plate may be positioned against the upper set of blocks and may have at least one hole formed there through. The lower plate may be positioned against the lower set of blocks and may have at least one hole formed therethrough. One or more tubes may be secured between the upper set of blocks and the lower set of blocks, wherein a bolt is threaded through the holes of the upper plate and lower plate and the passageways of the upper set of blocks and lower set of blocks.

In an embodiment of the system of the present invention, the plurality of intersecting blocks includes intersecting blocks having recesses of various sites to accommodate various sizes of tubing.

In an embodiment, each of the intersecting blocks has a label thereon indicative of the size of tubing for which the recess is sized.

In an embodiment, a slot of one of the interlocking blocks frictionally engages the protrusion of adjacent interlocking block.

The present invention is also a block for a modular tubing clamping system. The block includes a body, a protrusion formed through one end of the body, a slot formed on opposite end of the body, the slot defining an opening corresponding to a size and shape of the protrusion, and a recess formed on the body, the recess having a pair of opposing angled edges of that to abut a tube.

In an embodiment, the slot includes a pair of arms extending outwardly of the body, each of which has an inwardly extending portion to secure a protrusion of adjacent block therein, and an open bottom end adapted to receive a protrusion of the adjacent block. A seat may be formed on the body adjacent the protrusion, the slot of the adjacent block abutting the seat when the adjacent interlocking block receives the protrusion.

The pair of opposing angled edges of the recesses of the blocks may have a radius corresponding to a radius of the tube.

The present invention is also a modular tubing clamping system including an upper set of interlocking blocks with a first interlocking block having first recess on the bottom side thereof, the first recess having a first size, and a second interlocking block having a second recess on the bottom side thereof, the second recess having a second size. A lower set of interlocking blocks includes a third interlocking block having a third recess on a top side thereof, the third recess having a third size equal to the first size of the first interlocking block, and a fourth interlocking block having a fourth recess on topside thereof, the fourth recess having a fourth size equal to the second size of the second locking block.

In an embodiment, the first size of the first recess is equal to the second size of the second recess.

In an embodiment, the modular tubing clamping system each of the interlocking blocks include a protrusion and a slot. The slot is received by the protrusion of an adjacent interlocking block.

In an embodiment, the modular tubing clamping system further includes a first end piece block affixed to the first interlocking block, the first end piece block having passageway formed therethrough, a second end piece block affixed to the third interlocking block, the second end piece block having a passageway formed there through, an upper plate positioned against the upper set of interlocking blocks, the upper plate having a hole formed there through, the hole being in line with a passageway of the first end piece, a lower plate positioned against the lower set of interlocking blocks, the lower plate having a hole formed there through the hole being in line with a passageway of the third end piece, and a bolt threaded through the holes of the upper plate and lower plate and the passageways of the first end piece and second end piece.

The foregoing "Summary of the Invention" is intended to describe the preferred embodiment of the present invention and, as such, should not be construed as limiting the scope of the present invention. The scope of the present invention should be defined by the claims herein. This Summary of the Invention should not be limiting of the various forms of the present invention that would be encompassed by the present claims.

DETAILED DESCRIPTION OF THE INVENTION

Figure 1:
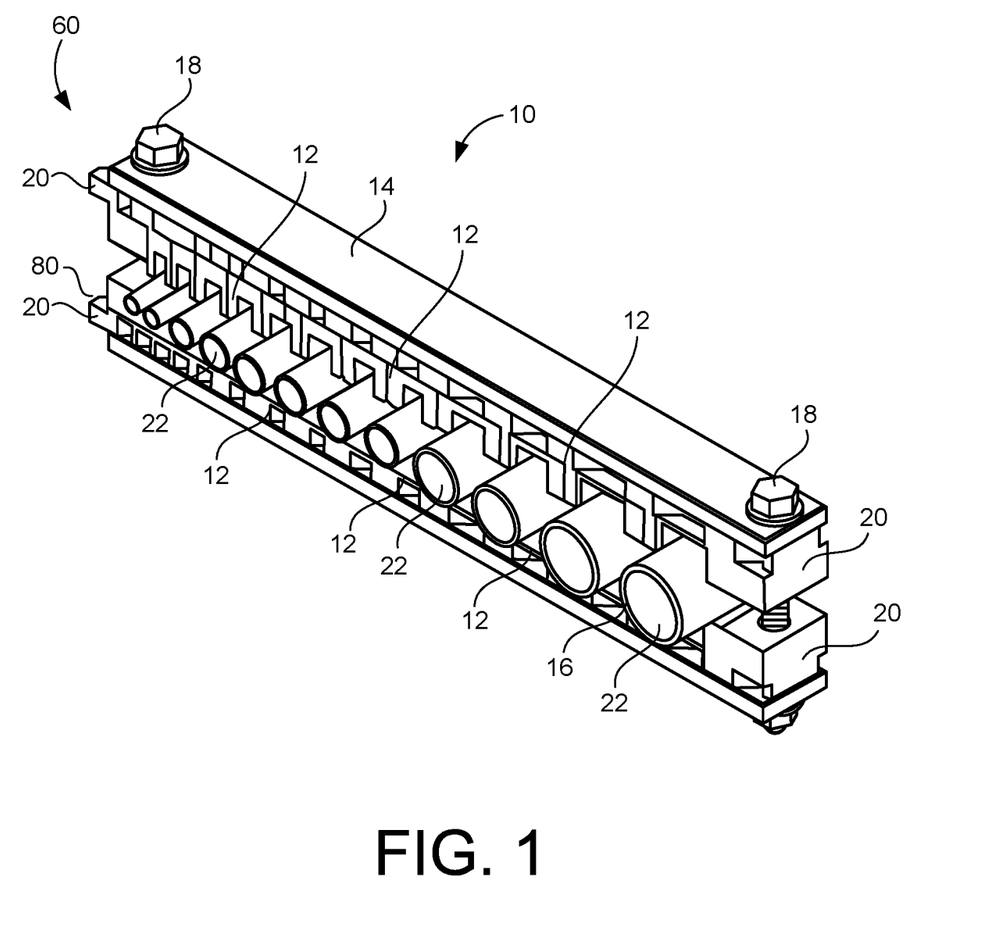
FIG. 1 is a perspective view of the modular tubing clamp system of the present invention.

Referring to FIG. 1, there is shown a perspective view of the modular tubing clamp system 10 of the present invention. As can be seen in FIG. 1, the clamping system 10 includes a plurality of interlocking blocks 12 affixed to each other. The plurality of interlocking blocks 12 are utilized to support tubing and include an upper set of blocks 60 and an identical and inverted lower set of blocks 80.

The plurality of interlocking blocks 12 are supported between an upper plate 14 and a lower plate 16. The upper plate 14 and lower plate 16 can be formed of a metal material or other material and serve to hold the plurality of blocks in place and tubing 22 therebetween. The upper plate 14 is positioned against a top surface of the upper set of blocks 60, while the lower plate 16 is positioned against the lower set of blocks 80.

The upper plate 14 is secured to lower plate 16 by a pair of fasteners 18. The pair of fasteners extend through holes in the plates and each of the end blocks 20 of the upper set of blocks 60 and lower set of blocks 80. With the fasteners 18 engaged, the tubing 22 is held in place between the upper and lower sets of blocks 60 and 80. As can be seen in FIG. 1, a variety of sizes of tubing are held by the modular clamping tubing system 10.

Figure 2:
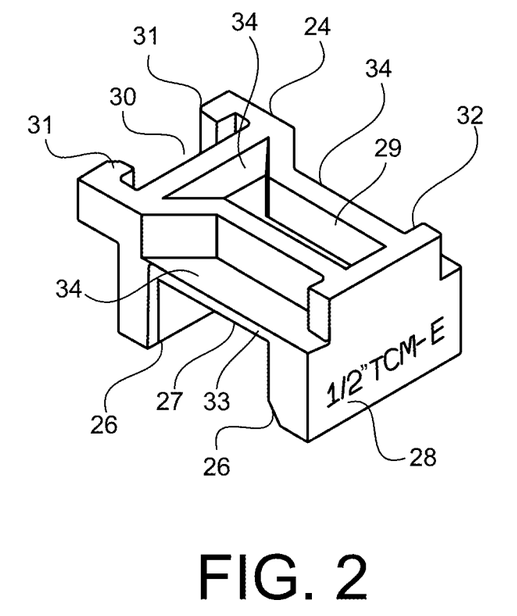
FIG. 2 is an isolated view of a 1 inch block of the system of the present invention.

FIG. 2 shows an isolated view of a 1 inch block 24 adapted to position a 1 inch piece of tubing between the illustrated block 24 and an identical and inverted block positioned therebelow in the lower set of blocks 80. In FIG. 2, it can be seen how the block 24 has opposing angled edges 26 define a recess 27 on the bottom side thereof. The recess 27 and opposing angled edges 26 are sized to fit a certain size of tubing. The opposing angled edges 26 are adapted to support the tubing above and below the block 24. The opposing angled edges 26 provide support to the tubing while minimally contacting the tubing, thus reducing the chance of corrosion and other wear in the tubing. The opposing angled edges 26 may have a radius corresponding to a radius of a tube to be supported.

In FIG. 2, it can also be seen how the block 24 has a label 28 thereon indicating the size of tubing for use with a particular block. As can be appreciated, different blocks of the plurality of blocks 12 would have different labels on them to identify the size of tubing to be used with the particular block.

FIG. 2 also illustrates how the block 24 has a protrusion 32 on one side thereof and a slot 30 on opposite side thereof. The protrusion 32 is received in the slot 30 of another of the modular blocks which the user wish to secure to the block 24. Preferably, the slot 30 has a pair of arms 31 suitable for securing the protrusion 32 therein. The slot 30 has a pair of arms 31 which extend outwardly from the body 29 of the interlocking block 24. The pair of arms 31 preferably have inwardly extending portion such that the slot has a shape and size corresponding to the shape and size of the protrusion 32. In other embodiments, the slot may be enclosed on four sides and the protrusion sized to fit within the slot.

As used herein, the term body includes the main portion of the interlocking block 24 existing between the named components.

FIG. 2 also shows several voids 34 formed in the body of the block 24. The voids 34 are provided to reduce the weight of the block 24. Preferably, the block 24 of the tubing clamp system 10 of the present invention is injection molded in a plastic material, thus making it lightweight and less subject to corrosion.

A seat 33 is preferably formed on each side of the block 24 within the voids 34. The seat 33 abuts the open bottom end of the slot 30 of an adjacent block. The slot, combined with the seat 33 secures adjacent blocks to one another.

Figure 2A:
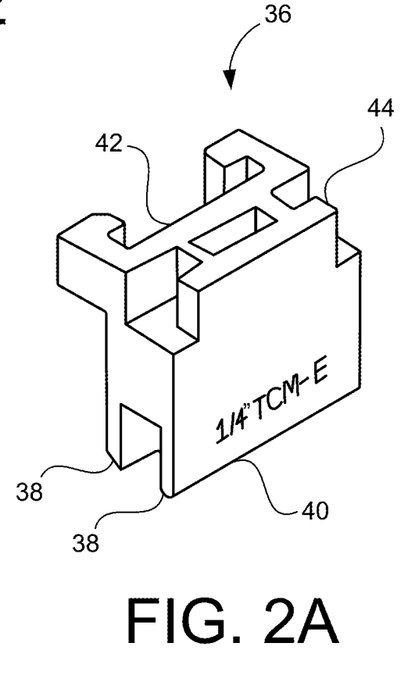
FIG. 2A is an isolated view of a ¼ inch block of the system of the present invention.

FIG. 2A shows a perspective view of a ¼ inch block 36 in accordance with the preferred embodiment the present invention. Similar to the block 24, the ¼ inch block 36 has opposing angled edges 38 sized so as to abut a ¼ inch tubing and hold support the tubing between the block 36 and an opposing inverted block. The label 40 shows the size of tubing to use with the block 36. As with the block 24, the ¼ inch block 36 has a slot 42 and a protrusion 44. The slot 42 and protrusion 44 of the block 36 are preferably identical in size and configuration to the slot 30 and protrusion 32 of the 1 inch block 24, enabling the block 36 to be engaged with the block 24.

Figure 3:
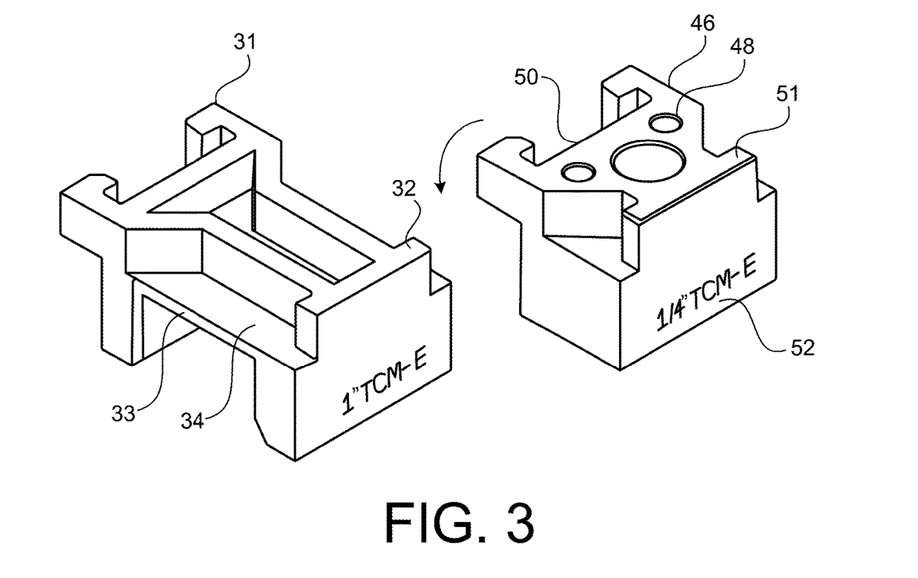
FIG. 3 is a perspective view showing a universal end block being attached to a 1 inch block in accordance with the preferred embodiment of the system of the present invention.

FIG. 3 shows a perspective view of a universal end piece block 46. The universal end piece block 46 has a passageway 48 formed therethrough. The passageway 48 is suitable for receipt of the fastener 18. As with the other blocks described herein, the universal end piece block 46 has a slot 50, a protrusion 51, and a label 52. Additionally, the universal end piece block 46 may be provided with a protrusion 51 should it become necessary to use an end piece block 46 between two blocks configured to support tubing.

FIG. 3 also illustrated connection of two blocks. Specifically, it can be seen how the protrusion 32 of the tubing-supporting adjacent block 24 is received in slot 50 of the universal end piece block 46. The bottom surface of the slot 50 of the universal end piece block 46 rests against a seat 33 in the void area 34 of the adjacent block 24. Each of the slots are preferably sized so that they are frictionally engaged with the protrusion of the adjacent block, ensuring a snug connection between the two blocks. Connection of the various blocks is accomplished in the same manner.

Figure 4:
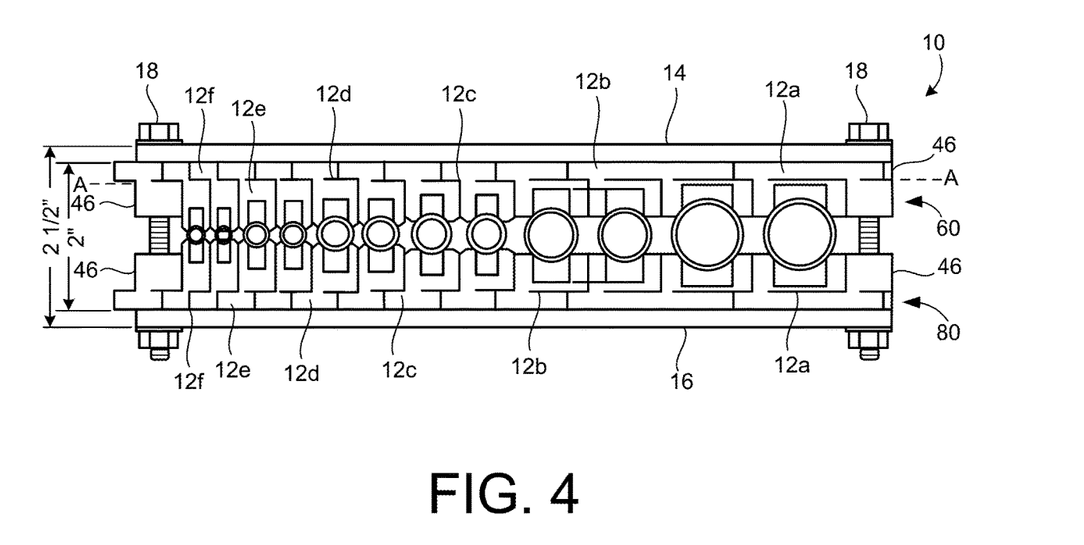
FIG. 4 is a side view of the assembled modular tubing clamp system of the present invention.
Figure 5:
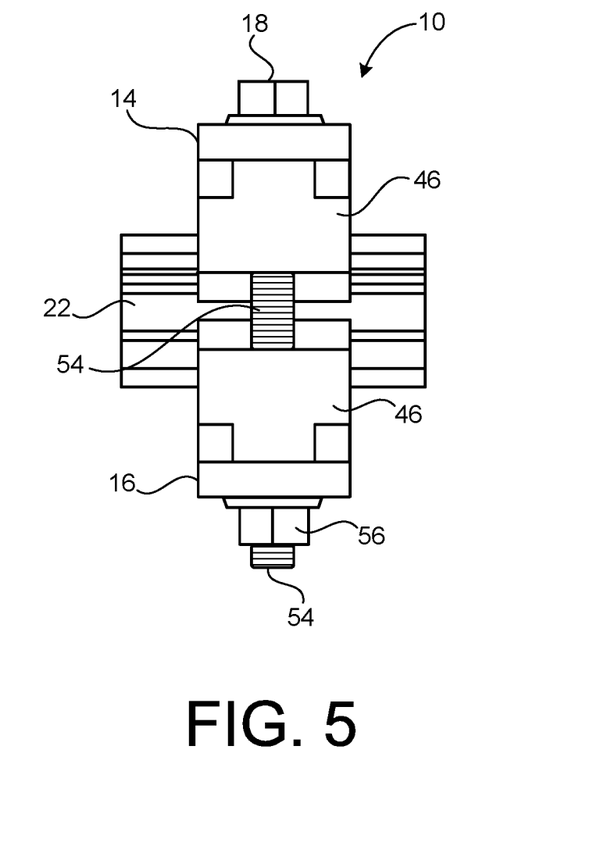
FIG. 5 is a front view of the assembled tubing clamp system of the present invention.

FIG. 4 shows a front view of the assembled modular tubing clamping system 10 of the present invention. In FIG. 4, the plurality of blocks 12 include blocks 12a, 12b, 12c, 12d, 12e and 12f. In one example, the blocks 12a are sized to fit 1 inch tubing, while the blocks 12f are sized to fit ¼ inch tubing. Notable in FIG. 4 is that the line A illustrates how regardless of the size of tubing, the particular block associated with that tubing can be connected to any other of the plurality of blocks 12. While FIG. 4 illustrates the tubing going from small to large or large to small, the tubing sizes can be arranged in any manner that the job requires.

In order to assemble the clamping system 10 of the present invention to provide for support of the tubing 22 as illustrated in FIG. 4, the worker simply needs to assemble to identical strings upper and lower sets of blocks 60 and 80. In FIG. 4, the worker would thus build an upper set of blocks 60 starting with the universal end piece block 46, followed by two of blocks 12a, two of blocks 12b, two of blocks 12c, two of blocks 12d, two of blocks 12e, two of box 12f and one of the universal end piece blocks 46. Then, the worker would create an identical lower set of blocks 60 so as to form the lower end of the clamping system 10. With the upper and lower sets of blocks 60 and 80 positioned around the tubing 22, the upper and lower plates 14 and 16 can be positioned over the blocks and fasteners 18 connected. As such, given a set of blocks, a worker can quickly assemble any tubing clamp configuration on-site, without the need to order specifically-manufactured tubing clamp configurations.

As can be appreciated, the modular tubing clamping system 10 of the present invention is also adaptable to changes on-site. Using the example of FIG. 4, if one of the blocks 12A, suitable for supporting a 1 inch tubing, needed to be switched with a block supporting a ¼ inch tubing, then the worker would simply need to partially disassemble the upper and lower sets of blocks 60 so as to switch the block 12a with the block 12f. Additionally, the modular nature of the present invention allows for any damaged tubing clamp assemblies to be easily repaired or replaced.

Most importantly, the various blocks of the clamping system of the present invention are interchangeable. They are also lightweight, configurable on-demand and versatile. As can be appreciated, installation of the tubing clamp system of the present invention may require much less time both in terms of manufacturing and assembly, as they do not need to be manufactured for specific arrangements of tubing. The time savings associated with the present invention has the potential for great cost savings during both construction and repair of a facility.

The foregoing disclosure and description of the invention is illustrative and explanatory thereof. Various changes in the details of the illustrated construction or the steps of the described apparatus can be made within the scope of the appended claims without departing from the true spirit of the invention. The present invention should only be limited by the following claims and their legal equivalents.

I claim:

1. A modular tubing clamp system comprising:
   an upper plate;
   a lower plate;
   a plurality of interlocking blocks forming an upper set of blocks and an inverted lower set of blocks, said upper set of blocks and said inverted lower set of blocks adapted to secure tubing therebetween, each of said plurality of interlocking blocks comprising:
      a body;
      a protrusion on one end of said body;
      a slot on an opposite end of said body, said slot being received by a protrusion of an adjacent interlocking block; and
      a recess formed on said body, said recess adapted to receive a tube; and
   a plurality of end piece blocks, each of said plurality of end piece blocks comprising:
      a body;
      a protrusion on one end of said body;
      a slot on an opposite end of said body, said slot being received by a protrusion of an adjacent interlocking block; and
      a passageway formed through said body.

2. The modular tubing clamp system of claim 1, said recess having a pair of opposing angled edges adapted to abut said tube.

3. The modular tubing clamp system of claim 2, said pair of opposing angled edges having a radius corresponding to a radius of said tube.

4. The modular tubing clamp system of claim 1, each of said plurality of interlocking blocks further comprising:
   a seat formed on said body adjacent said protrusion, a slot of an adjacent interlocking block abutting said seat when said slot of said adjacent interlocking block receives said protrusion.

5. The modular tubing clamp system of claim 1, said slot of each of said plurality of interlocking blocks comprising:
   a pair of arms extending outwardly of said body, each of said pair of arms having an inwardly extending portion to secure a protrusion of an adjacent interlocking block therein; and
   an open bottom end adapted to receive said protrusion of an adjacent interlocking block.

6. The modular tubing clamp system of claim 1, each of said upper set of blocks and said lower set of blocks comprising:
   a first end piece block;
   a second end piece block; and
   a plurality of interlocking blocks connected to and positioned between said first end piece block and said second end piece block.

7. The modular tubing clamp system of claim 6, wherein:
   said upper plate is positioned against said upper set of blocks, said upper plate having at least one hole formed therethrough;
   said lower plate is positioned against said lower set of blocks, said lower plate having at least one hole formed therethrough;
   one or more tubes are secured between said upper set of blocks and said lower set of blocks; and wherein
   a bolt is threaded through said at least one hole of said upper plate, said passageway of said first end piece block of said upper set of blocks, said passageway of said first end piece block of said lower set of blocks, and said at least one hole of said lower plate.

8. The modular tubing clamp system of claim 1, said plurality of interlocking blocks comprising interlocking blocks having recesses of various sizes to accommodate various sizes of tubing.

9. The modular tubing clamp system of claim 8, each of said plurality of interlocking blocks having a label thereon indicative of the size of tubing for which the recess is sized.

10. The modular tubing clamp system of claim 1, said slot of one of said plurality of interlocking blocks frictionally engaging said protrusion of said adjacent interlocking block.

11. A modular tubing clamp system comprising:
    an upper set of interlocking blocks comprising:
       a first interlocking block having a first recess on a bottom side thereof, said first recess have a first size; and
       a second interlocking block having a second recess on a bottom side thereof, said second recess having a second size;
    a lower set of interlocking blocks comprising:
       a third interlocking block having a third recess on a top side thereof, said third recess having a third size equal to said first size of said first interlocking block; and
       a fourth interlocking block having a fourth recess on a top side thereof, said fourth recess having a fourth size equal to said second size of said second interlocking block;
    a first end piece block affixed to said first interlocking block, said first end piece block having a passageway formed therethrough;

a second end piece block affixed to said third interlocking block, said second end piece block having a passageway formed therethrough;

an upper plate positioned against said upper set of interlocking blocks, said upper plate having a hole formed therethrough, said hole being in line with said passageway of said first end piece;

a lower plate positioned against said lower set of interlocking blocks, said lower plate having a hole formed therethrough, said hole being in line with said passageway of said third end piece; and a bolt threaded through said hole of said upper plate, said passageway of said first end piece, said passageway of said second end piece, and said hole of said lower plate.

12. The modular tubing clamp system of claim 11, wherein said first size of said first recess is equal to said second size of said second recess.

13. The modular tubing clamp system of claim 11, each of said interlocking blocks comprising:

a protrusion;

a slot, said slot being received by a protrusion of an adjacent interlocking block.

* * * * *